United States Patent
Schindler et al.

(10) Patent No.: US 9,321,323 B2
(45) Date of Patent: Apr. 26, 2016

(54) ADJUSTABLE WHEEL SUSPENSION FOR THE WHEELS OF AN AXLE OF A MOTOR VEHICLE

(71) Applicant: AUDI AG, Ingolstadt (DE)

(72) Inventors: Andreas Schindler, Ingolstadt (DE); Heinrich Beringer, Denkendorf (DE); Ruben Goldberg, Ingolstadt (DE); Christian Isakiewitsch, Ingolstadt (DE); Joachim Schmitt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/407,815

(22) PCT Filed: May 24, 2013

(86) PCT No.: PCT/EP2013/001533
§ 371 (c)(1),
(2) Date: Dec. 12, 2014

(87) PCT Pub. No.: WO2013/185879
PCT Pub. Date: Dec. 19, 2013

(65) Prior Publication Data
US 2015/0165862 A1  Jun. 18, 2015

(30) Foreign Application Priority Data

Jun. 15, 2012  (DE) .......................... 10 2012 011 918

(51) Int. Cl.
*B60G 7/02* (2006.01)
*B60G 21/055* (2006.01)
*B60G 17/02* (2006.01)

(52) U.S. Cl.
CPC .......... *B60G 21/0553* (2013.01); *B60G 17/025* (2013.01); *B60G 21/0555* (2013.01); *B60G 2206/60* (2013.01)

(58) Field of Classification Search
USPC ..................... 280/124.109, 124.13, 124.149, 280/124.152, 124.166
See application file for complete search history.

(56) References Cited

U.S. PATENT DOCUMENTS

| | | | | |
|---|---|---|---|---|
| 5,542,705 A | * | 8/1996 | Parker et al. | 280/124.103 |
| 5,938,247 A | * | 8/1999 | Santhuff | 280/124.13 |
| 6,022,030 A | * | 2/2000 | Fehring | 280/5.511 |
| 6,698,767 B2 | * | 3/2004 | Hagan | 280/5.511 |
| 6,832,772 B2 | * | 12/2004 | Conover | 280/124.106 |

(Continued)

FOREIGN PATENT DOCUMENTS

| | | |
|---|---|---|
| DE | 296 04 898 | 8/1997 |
| DE | 101 26 928 | 12/2002 |
| DE | 102 42 552 | 3/2004 |
| DE | 10 2004 002 550 | 8/2005 |
| DE | 10 2006 001 709 | 7/2007 |
| DE | 20 2006 016 344 | 4/2008 |

(Continued)

OTHER PUBLICATIONS

International Search Report issued by the European Patent Office in International Application PCT/EP2013/001533 on May 24, 2013.

*Primary Examiner* — Toan To
(74) *Attorney, Agent, or Firm* — Henry M. Feiereisen LLC.

(57) ABSTRACT

An adjustable wheel suspension for the wheels of an axle of a motor vehicle is disclosed, wherein each wheel is guided by means of wheel guide elements and each wheel is operatively connected to a torsion bar, which can be adjusted by means of an adjusting device, via its wheel guide elements, the torsion bars being partially aligned with each other and each torsion bar being mounted on an auxiliary frame by its associated adjusting device. The two adjusting devices are connected to one another via a crossmember of the housing.

3 Claims, 1 Drawing Sheet

(56) References Cited

U.S. PATENT DOCUMENTS

| | | | |
|---|---|---|---|
| 7,931,281 B2 * | 4/2011 | Maeda et al. | 280/5.511 |
| 8,505,938 B2 * | 8/2013 | King | 280/124.107 |
| 8,511,697 B2 * | 8/2013 | Ohletz et al. | 280/124.13 |
| 2004/0084857 A1 | 5/2004 | Vortmeyer | |
| 2005/0179221 A1 * | 8/2005 | Yasui et al. | 280/5.506 |
| 2006/0116802 A1 * | 6/2006 | Yamada et al. | 701/37 |
| 2006/0273539 A1 * | 12/2006 | Barth et al. | 280/124.107 |
| 2009/0008887 A1 * | 1/2009 | Buma | 280/5.511 |
| 2011/0278811 A1 | 11/2011 | Ohletz | |
| 2012/0306174 A1 | 12/2012 | Schmid et al. | |
| 2013/0099455 A1 | 4/2013 | Beringer et al. | |

FOREIGN PATENT DOCUMENTS

| | | |
|---|---|---|
| DE | 10 2007 024 770 | 11/2008 |
| DE | 10 2009 005 895 | 7/2010 |
| DE | 10 2009 005 898 | 7/2010 |
| DE | 10 2009 045 619 | 4/2011 |
| DE | 10 2011 018 574 | 10/2012 |
| EP | 0 779 204 | 6/1997 |
| EP | 1 321 351 | 6/2003 |
| EP | 2 517 905 | 10/2012 |
| JP | 2008-302731 | 12/2008 |

* cited by examiner

ADJUSTABLE WHEEL SUSPENSION FOR THE WHEELS OF AN AXLE OF A MOTOR VEHICLE

CROSS-REFERENCES TO RELATED APPLICATIONS

This application is the U.S. National Stage of International Application No. PCT/EP2013/001533, filed May 24, 2013, which designated the United States and has been published as International Publication No. WO 2013/185879 and which claims the priority of German Patent Application, Serial No. 10 2012 011 918.6, filed Jun. 15, 2012, pursuant to 35 U.S.C. 119(a)-(d).

BACKGROUND OF THE INVENTION

The invention relates to an adjustable wheel suspension for the wheels of an axle of a motor vehicle.

So-called active systems for steadying the body of a motor vehicle are amply known. For this purpose setting devices are usually used for rotating a torsion bar. Applying a torque on the torsion bar generates active forces, which can influence the rolling movement or the movement of the body of the motor vehicle.

Thus, for example DE 101 26 928 A1, DE 10 2004 002 550 A1 or DE 102 42 552 B4 discloses corresponding arrangements for two-part stabilizers with a setting device for influencing the spring rates and the driving characteristics of motor vehicles. Hereby the rolling behavior or the incline of the motor vehicle in curves can be reduced by adjusting the divided torsion bars of the overall u-shaped stabilizers in opposite directions or the pitch movement for example during braking can be counteracted by adjustment in the same direction.

An adjustable wheel suspension of the generic type for the wheels of a motor vehicle is described in DE 10 2009 005 898 A1. Here each wheel of the axle is supported on a auxiliary frame via multiple wheel-guiding elements and is operatively connected with an adjustable torsion bar via its wheel-guiding elements. Each torsion bar is assigned an setting device via which torques can be applied on the torsion bar for example in order to counteract a rolling movement. For this purpose corresponding control devices are provided for open loop or closed loop control of the setting device. The components control device, setting device and torsion bar are each respectively fastened on the auxiliary frame. A disadvantage is here that due to the direct fastening of the components controller, setting device and torsion bars on the auxiliary frame, the auxiliary frame has to be correspondingly reinforced and with this has to be constructed larger in the region of the fastening site in order to ensure absorption of the acting forces and torques. Besides a greater weight this also increases production costs.

A generic adjustable wheel suspension for the wheels of an axle of a motor vehicle, which includes all features of patent claim 1, is disclosed in the after published patent application DE 10 2011 018 574 A1.

SUMMARY OF THE INVENTION

The invention is based on the object to further improve an adjustable wheel suspension of the wheels of an axle of a motor vehicle according to the type set forth in the preamble of the independent claim so that the auxiliary frame has a smaller weight and can be produced more cost-effectively.

This object is solved by an adjustable wheel suspension for the wheels of an axle of a motor vehicle, in which each wheel is guided via wheel guiding elements and each wheel is operatively connected via its wheel guiding elements with a torsion rod which can be adjusted via an setting device, wherein the torsion rods are arranged so as to be partially aligned with each other and are oriented in transverse direction of the vehicle and are each supported on a auxiliary frame via their assigned setting device, wherein the two setting devices are connected with each other via a housing crossmember, wherein the housing crossmember is configured and dimensioned so that the auxiliary frame can be constructed without a transverse member.

The dependent claims form advantageous refinements of the invention.

As is known, each wheel of the adjustable wheel suspension is guided via multiple wheel-guiding elements and each wheel of the axle is operatively connected with an adjustable torsion bar. In addition the torsion bars assigned to the respective wheels are arranged so as to be partially aligned and are oriented in transverse direction of the vehicle. For adjusting the torsion bar each torsion bar is assigned a setting device. The torsion bars are fastened on a vehicle-body-fixed auxiliary frame via the respective setting device. In addition the two setting devices or the housings of the setting devices are connected to each other via a housing crossmember. The housing crossmember absorbs the acting forces and bending moments. This has the effect that smaller forces or torques have to be transmitted via the interface setting device-auxiliary frame. This means that the auxiliary frame can be configured lighter in these regions, which in turn enables a more cost-effective production. In addition the transverse supporting effect of the housing crossmember allows to omit a connection point compared to the otherwise conventional 3-point support compared to the state of the art.

According to the invention the housing crossmember, which is oriented in transverse direction of the vehicle, is dimensioned so that the auxiliary frame can be constructed without a transverse member. The configuration and dimensioning according to the invention ensures that the housing crossmember additionally takes over the function of a transverse member of the auxiliary frame. Because now the auxiliary frame can be constructed without the font transverse member viewed in vehicle longitudinal direction, the auxiliary frame can be constructed significantly lighter.

According to a particularly advantageous embodiment of the invention, the housing crossmember is configured as a closed profile. The configuration of the housing crossmember as closed profile is particularly advantageous because this construction enables high stiffness, in particular bending stiffness, at low expenditure of material. Forces resulting from the setting process are directly transmitted into the structure without greater leverage effects. In addition the housing crossmember, which is constructed as a closed profile, takes over protective functions for torsion bars and setting device.

With regard to the closed profile different configurations are conceivable. Preferably the closed profile has a circular, rectangular or triangular cross section.

According to a further particularly advantageous configuration of the invention multiple moldings each having a horizontally oriented bore, are formed on the housing beam. Correspondingly the auxiliary frame is provided with correspondingly oriented horizontally oriented bores so that the housing beam can be fastened via a horizontally oriented threaded connection on the auxiliary frame. The horizontal threaded connection is particularly advantageous with regard to the smaller required mounting space.

BRIEF DESCRIPTION OF THE DRAWING

Further advantages features and applications of the present invention become apparent for then following description in connection with the exemplary embodiment shown in the drawing.

In the description, in the claims and in the drawing the terms and assigned reference numerals listed in the list below are used.

In the drawing it is shown in:

Figure 1:
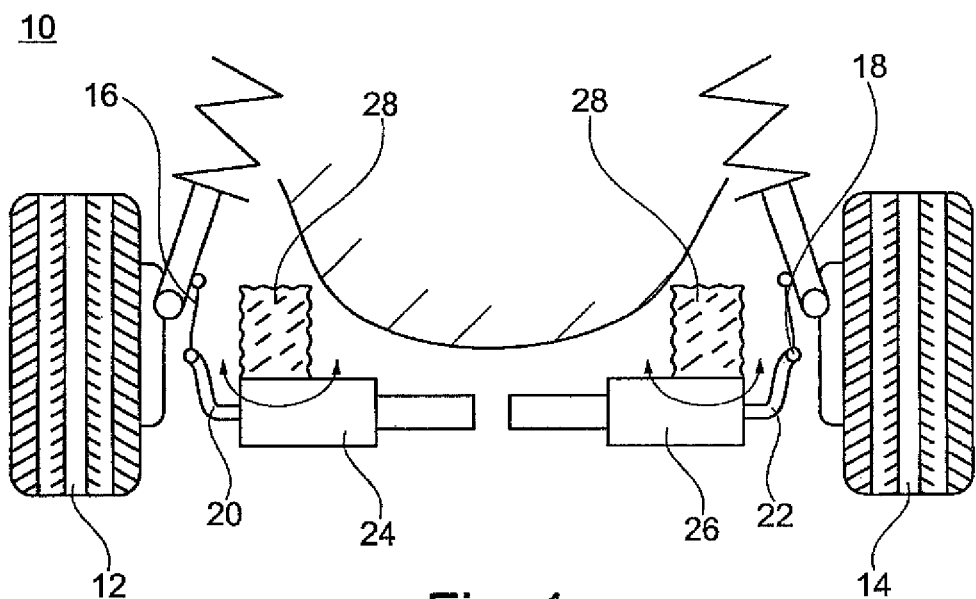
Figure 2:
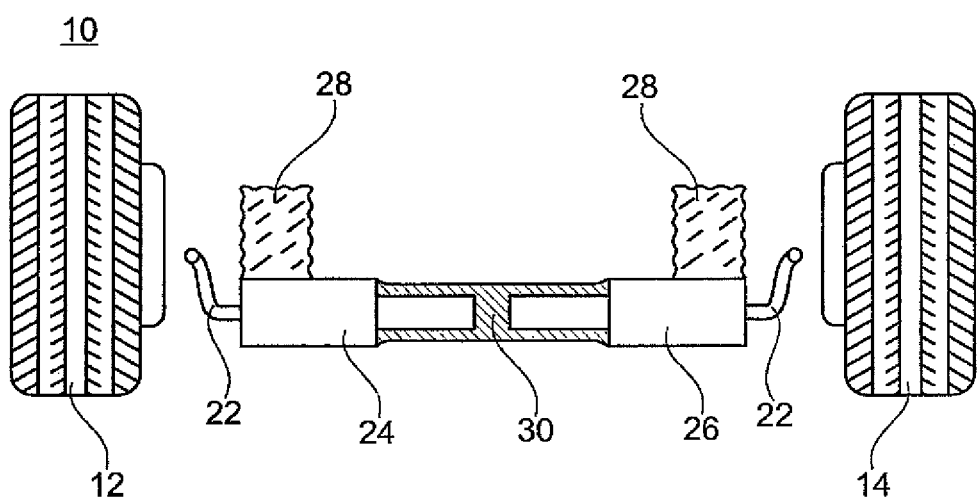

FIG. 1 an adjustable wheel suspension for the wheels of an axle of a motor vehicle according tot the state of the art, and FIG. 2 an adjustable wheel suspension constructed according to the invention.

DETAILED DESCRIPTION OF PREFERRED EMBODIMENTS

In the following description and in the figures same components and parts are designated with the same reference numerals insofar as no further differentiation is required or useful to avoid repetition.

FIG. 1 shows an adjustable wheel suspension overall designated with the reference numeral 10 for the wheels 12, 14 of an axle of a motor vehicle.

As can be seen from FIG. 1 each wheel 12, 14 is operatively connected to a torsion rod 20, 22 via a wheel guiding element 16, 18. Further wheel guiding elements are not shown for reasons of clarity, the two torsion rods 20, 22 are oriented in transverse direction FQ of the vehicle so as to be partially aligned with each other.

Each torsion rod 16, 18 is assigned a setting device 24, 26. The torques required for the adjustment of the torsion rods 16,18 are provided by the setting device 24 or 26.

The setting devices 24, 26 are directly fastened on an auxiliary frame 28, here only shown schematically. In order to be able to absorb the occurring forces and torques, the auxiliary frame 28 has to be reinforced in this region. This increases weight and costs.

This is where the invention comes into play.

As shown in FIG. 2 a housing crossmember 30 is arranged in the wheel suspension 10 according to the invention between the setting devices 24, 26.

The housing crossmember 30 connects the housing of the setting devices 24, 26. The housing crossmember 30 absorbs the acting forces and torques, i.e., the forces and torques acting on the interface setting device 24 or 26 and auxiliary frame 28 are strongly reduced.

As a consequence the reinforcement of the auxiliary frame, which in the state of the art is required in this region, is no longer required so that a lighter configuration of the auxiliary frame is possible.

As further shown in FIG. 2 the aligned regions of the torsion rods 20, 22 and with this also the housing beam 30 are oriented in transverse direction FQ of the vehicle. The housing beam 30 is configured and dimensioned so that the housing beam 30 additionally takes over the function of a normally required auxiliary frame transverse member. As a consequence the auxiliary frame 28 is constructed without a front auxiliary frame transverse member, which leads to a further weight reduction.

The invention claimed is:

1. An adjustable wheel suspension for the wheels of an axle of a motor vehicle, comprising:
   adjustable torsion bars respectively assigned to the wheels in one to one correspondence and operatively connected to the wheels via a respective wheel guiding element, said torsion bars being partially aligned with each other and oriented in transverse direction of the vehicle;
   a setting device respectively assigned to each of the torsion bars, each of the torsion bars being respectively supported via the setting device on an auxiliary frame of the motor vehicle; and
   a housing crossmember connecting the setting device of one of the torsion bars and the setting device of another one of the torsion bars with each other, said housing crossmember being configured and dimensioned so as to provide sufficient stability to enable construction of the auxiliary frame without a transverse member.

2. The adjustable wheel suspension of claim 1, wherein the housing crossmember is configured as a closed profile.

3. The adjustable wheel suspension of claim 2, wherein the closed profile has a circular, rectangular or triangular cross section.

* * * * *